United States Patent
Iojoiu et al.

(10) Patent No.: US 9,850,795 B2
(45) Date of Patent: Dec. 26, 2017

(54) METHOD AND INTERNAL COMBUSTION ENGINE ARRANGEMENT FOR REGENERATING AN EXHAUST AFTER-TREATMENT DEVICE

(71) Applicants: RENAULT TRUCKS, Saint Priest (FR); VOLVO TRUCK CORPORATION, Göteborg (SE)

(72) Inventors: Eduard Emil Iojoiu, Vourey (FR); Raphaël Pourret, Bron (FR); Martin Petersson, Hisings Kärra (SE); Björn Häggendal, Ytterby (SE); Johan Dahl, Göteborg (SE)

(73) Assignees: Volvo Truck Corporation, Göteborg (SE); Renault Trucks, St. Priest (FR)

(*) Notice: Subject to any disclaimer, the term of this patent is extended or adjusted under 35 U.S.C. 154(b) by 0 days.

(21) Appl. No.: 14/779,019

(22) PCT Filed: Apr. 3, 2013

(86) PCT No.: PCT/IB2013/001007
§ 371 (c)(1),
(2) Date: Sep. 22, 2015

(87) PCT Pub. No.: WO2014/162163
PCT Pub. Date: Oct. 9, 2014

(65) Prior Publication Data
US 2016/0053648 A1    Feb. 25, 2016

(51) Int. Cl.
F01N 3/18 (2006.01)
F01N 3/20 (2006.01)
(Continued)

(52) U.S. Cl.
CPC .......... *F01N 3/2006* (2013.01); *F01N 3/023* (2013.01); *F01N 3/027* (2013.01); *F01N 3/0232* (2013.01);
(Continued)

(58) Field of Classification Search
CPC ........ F01N 3/0231; F01N 3/035; F01N 3/103; F01N 3/2066; F01N 9/002; F01N 9/005;
(Continued)

(56) References Cited

U.S. PATENT DOCUMENTS

| 7,677,028 B2* | 3/2010 | Kapparos | F01N 3/0256 60/286 |
| 2002/0189247 A1* | 12/2002 | Kato | F01N 3/0835 60/297 |

(Continued)

FOREIGN PATENT DOCUMENTS

| FR | 2865768 A1 | 8/2005 |
| JP | 2005214178 | 8/2005 |

(Continued)

OTHER PUBLICATIONS

International Search Report dated Dec. 18, 2013 for corresponding International App. PCT/IB2013/001007.
(Continued)

*Primary Examiner* — Jorge Leon, Jr.
(74) *Attorney, Agent, or Firm* — WRB-IP LLP (57) ABSTRACT

A process is provided for regenerating an exhaust gas after-treatment device in an exhaust line of an internal combustion engine arrangement, the exhaust line including a particle filter. The process includes identifying when soot loading of the particle filter exceeds a predetermined level. After that, temperature of exhaust gases at the particle filter is maintained within a first temperature range until at least one of a predetermined period of time has lapsed or a
(Continued)

determination is made that soot loading of the particle filter is below the predetermined level. After that, the temperature of the exhaust gases at the particle filter is increased to within a second temperature range above the first temperature range. An internal combustion engine arrangement is also disclosed.

53 Claims, 4 Drawing Sheets

(51) Int. Cl.
*F02D 41/02* (2006.01)
*F01N 3/027* (2006.01)
*F01N 3/035* (2006.01)
*F01N 3/023* (2006.01)
*F01N 3/10* (2006.01)
*F01N 13/00* (2010.01)
*F01N 9/00* (2006.01)
*F02D 41/14* (2006.01)

(52) U.S. Cl.
CPC ........... *F01N 3/2066* (2013.01); *F01N 9/002* (2013.01); *F02D 41/029* (2013.01); F01N 3/0231 (2013.01); F01N 3/035 (2013.01); F01N 3/103 (2013.01); F01N 9/005 (2013.01); F01N 13/009 (2014.06); F01N 2240/16 (2013.01); F01N 2900/0412 (2013.01); F01N 2900/0418 (2013.01); F01N 2900/0422 (2013.01); F01N 2900/0601 (2013.01); F01N 2900/0602 (2013.01); F01N 2900/08 (2013.01); F01N 2900/1404 (2013.01); F01N 2900/1602 (2013.01); F01N 2900/1606 (2013.01); F01N 2900/1621 (2013.01); F02D 41/1467 (2013.01); F02D 2041/1433 (2013.01); F02D 2200/0812 (2013.01); Y02T 10/47 (2013.01)

(58) Field of Classification Search
CPC ............... F01N 13/009; F01N 2240/16; F01N 2900/0412; F01N 2900/0418; F01N 2900/0422; F01N 2900/0601; F01N 2900/08; F01N 2900/1404; F01N 2900/1602; F01N 2900/1606; F01N 2900/1621

USPC ......... 60/274, 276, 286, 295, 297, 300, 301, 60/303, 311, 320
See application file for complete search history.

(56) References Cited

U.S. PATENT DOCUMENTS

| | | | |
|---|---|---|---|
| 2005/0166582 A1* | 8/2005 | Gotou | F01N 3/0253 60/297 |
| 2007/0199312 A1 | 8/2007 | Kapparos et al. | |
| 2008/0314029 A1* | 12/2008 | Okugawa | F02D 41/029 60/286 |
| 2009/0019831 A1* | 1/2009 | Heibel | F01N 3/021 60/274 |
| 2009/0120068 A1* | 5/2009 | Sakimoto | F01N 3/0231 60/285 |
| 2010/0089042 A1 | 4/2010 | King et al. | |
| 2010/0218486 A1* | 9/2010 | Murata | B01D 53/9431 60/286 |
| 2010/0326055 A1 | 12/2010 | Huber et al. | |
| 2011/0000190 A1 | 1/2011 | Svensson et al. | |
| 2011/0036076 A1* | 2/2011 | Gonze | F01N 3/027 60/286 |
| 2011/0271657 A1 | 11/2011 | Tan et al. | |
| 2011/0289903 A1* | 12/2011 | Doring | F01N 3/0231 60/274 |
| 2013/0025266 A1* | 1/2013 | Li | F01N 3/103 60/287 |
| 2013/0177482 A1* | 7/2013 | Ikawa | B01D 53/9495 422/109 |

FOREIGN PATENT DOCUMENTS

| | | |
|---|---|---|
| JP | 2005337153 | 12/2005 |
| JP | 2007198281 | 8/2007 |
| JP | 2009191684 | 8/2009 |
| JP | 2010144557 | 7/2010 |
| JP | 2011241783 | 12/2011 |
| WO | 2007053367 A2 | 5/2007 |

OTHER PUBLICATIONS

Japanese Official Action (dated Sep. 28, 2016) (translation) for corresponding Japanese App. JP 2016-505892.

\* cited by examiner

METHOD AND INTERNAL COMBUSTION ENGINE ARRANGEMENT FOR REGENERATING AN EXHAUST AFTER-TREATMENT DEVICE

BACKGROUND AND SUMMARY

The present invention relates generally to methods and apparatus for regenerating an exhaust after-treatment device and, more particularly, to methods and apparatus for regenerating an exhaust after-treatment device using a two-stage regeneration.

Environment regulations have necessitated the addition of various exhaust after-treatment devices in exhaust after-treatment systems (EATS) for internal combustion engines. For diesel engines, for example, it is now common to include a particle filter (typically referred to as a diesel particulate filter or DPF) in the EATS. Gasoline engines, especially those of the direct injection type where fuel is directly injected in the combustion chamber, may also in the future be equipped with such filters. An EATS may comprise other components, such a NOx reducing devices. In the case of a Diesel engine, a NOx reducing catalyst (typically a selective catalytic reduction catalyst (SCR)) is typically provided downstream of the particle filter and an oxidation catalyst (often referred to as a diesel oxidation catalyst (DOC)) upstream of or forming part of the filter. The oxidation catalyst oxidizes CO and NO in the engine exhaust and converts them to CO2 and NO2. Different arrangements for providing oxidation catalysts include a DOC with an uncoated DPF (so called CRT systems), DOC with a coated DPF (so called cCRT systems), and a coated DPF.

Exhaust from the engine is ordinarily at a temperature of about 250-350° C. and, at these temperatures, a certain amount of so-called "passive" N02 regeneration of the particle filter 29 can occur wherein collected soot can be oxidized and removed from the filter, particularly when aided by the oxidation catalyst upstream or on the particle filter, via the reaction(s):

$$C+2NO_2 \rightarrow CO_2+2NO \quad (1)$$

and/or $$C+NO_2 \rightarrow CO+NO \quad (2)$$

At low temperatures (<300° C.) the soot oxidation by N02 shows quite a low rate and therefore the soot loading of the particle filter can increase quite quickly in case of severe duty cycles, where the temperature of the exhaust gas may be bow 200° C. (cold unloaded cycles). Excessive soot on the particle filter can impair functioning of the particle filter or the engine. It sometimes happens that, over a given duty cycle a balance is reached wherein the soot that is collected by the particle filter is burned off at the approximately same rate as it is oxidized by passive regeneration, thereby maintaining the soot loading in the particle filter within acceptable levels. However, on certain duty cycles, soot loading becomes too high and it is necessary to regenerate the particle filter through a specific active regeneration procedure.

In the past, it was typical to perform the regeneration by a so-called "active" 02 regeneration. Active 02 regeneration occurs via the reaction(s):

$$C+O_2 \rightarrow CO_2 \quad (3)$$

and/or $$2C+O_2 \rightarrow 2CO \quad (4)$$

Active 02-based regeneration systems raise the temperature of the reactants, through a variety of methods, in order to establish and sustain an 02/soot reaction. During active 02-based regenerations, it is believed that substantially all soot removal is via reaction with 02.

A problem with 02 regeneration is that it is performed at high temperatures, usually around 600-625° C. for a catalyzed particle filter. The reaction is highly exothermal and it is generally considered that there is an unacceptable risk of "runaway" or uncontrolled regeneration at temperatures above 550° C. if soot loading levels of the particle filter are too high. For a given arrangement, one can determine a safe high temperature regeneration soot loading level, below which high temperature regeneration is assumed to be safe. It is then considered that performing a high temperature regeneration, when the particle filter is loaded at more than the safe high temperature soot loading level, involves a risk of uncontrolled regeneration. In some frequently used EATS arrangements, the safe high temperature soot loading level can be considered to be above about 2-8 grams of soot per liter of filter (expressed herein as gC/l filter). (The particular loading levels will vary due to various factors, such as filter type) Accordingly, because of the danger of uncontrolled regeneration at these soot loading levels above, an active 02 regeneration would be performed when soot loading levels approached that level, even though the particle filter and other components may have been capable of functioning adequately at much higher soot loading levels. Each 02 regeneration involves cycling the temperature of the filter or the exhaust gas at the particle filter to around 600-625° C. or higher. This cycling tends to increase wear on the particle filter, and also to involve substantial use of energy to heat the exhaust gas or filter.

In addition to regeneration of the particle filter, it is occasionally necessary to "de-poison" components in the EATS such as the oxidation catalyst or the NOx reduction catalyst, or even other NOx reducing devices such as so-called NOx traps. The catalyst poisons are typically removed by applying high thermal processes. In some specific cases (as S poisoning), the regeneration (sometimes referred to as "de-poisoning") requires quite high temperatures, as for example around 600° C. for a Cu-zeolite SCR catalyst. In an after-treatment system with an SCR downstream of the particle filter, reaching 600° C. in the SCR is only possible if temperatures are greater than 600° C. at the particle filter. At that temperature, while the SCR is de-sulfated, the filter is also regenerated (from soot). The regeneration at that temperature will be an active 02 regeneration and therefore it is further necessary to pay special attention to maximum soot loadings of the particle filter. Because it was necessary to keep soot loading below the level at which uncontrolled regeneration could occur if an 02 regeneration were performed, regeneration of the particle filter and/or de-sulfurization of the SCR would be quite frequent in order to prevent high exothermal effect in the filter. This frequent regeneration led to a higher fuel penalty and catalyst aging.

Because of the risk of uncontrolled regeneration, when soot loading levels are above the safe high temperature soot loading level at which there is considered to be an unacceptable risk of uncontrolled regeneration, and even when soot loading levels are below that level, 02 regeneration is usually only performed on vehicle-mounted engine arrangements when the vehicle is parked. This means that the vehicle is periodically taken out of service to perform the 02 regeneration.

It has recently been discovered that N02 regeneration with enhanced effective N02 supply (hereinafter referred to as "enhanced NO2 regeneration") occurs in an intermediate temperature range between the range of normal exhaust temperature at which passive NO2 regeneration tends to occur and the temperature range of active O2 regeneration, such as temperatures in a range of about 420-550° C. It has been theorized in U.S. Patent Application Publications US2011/0000190A1 and US2010/0326055A1, which are incorporated by reference, that, at temperatures of 450-550° C., less than two thirds and possibly less than half of the soot is removed by reaction with O2, while most of the rest of the soot is believed to react with NO2.

U.S. Patent Application Publications US2011/0000190A1 and US2010/0326055A1 introduce the concept of an "effective NO2 supply", which effective supply will be enhanced to increase its soot removal efficacy relative to the efficacy that would be expected during conventional NO2-based regeneration, even if the NO2/NO ratio and therefore the equilibrium-limited NO2 supply decreases. The effective NO2 supply was defined as the amount of NO2 that participates in soot oxidation. The participating NO2 can either come directly from the equilibrium-limited NO2 supply, NO oxidized in the catalyzed DPF, or from NO recycling. The concept of the soot removal capacity of the NO2 reactant was also introduced. Even though enhanced NO2 regeneration can cause the equilibrium-limited NO2 supply to decrease, it can at the same time greatly increase the effective NO2 supply, thereby increasing the soot removal capacity of the equilibrium-limited NO2 supply, resulting in a significantly higher soot oxidation rate. Conditions can be controlled so that, even though a lesser quantity of NO2 is supplied to the particle filter than under conventional conditions, the rate at which NO is converted to NO2 and that NO2 reacts with soot within the DPF is greater than under the conventional conditions where, ordinarily, a larger, equilibrium-limited quantity of NO2 would have been supplied to the DPF. It is theorized that the NO is effectively "recycled", usually more than once, through a catalytic reaction to form NO2, which in turn, reacts with soot, again forming NO which is catalytically reacted, etc. Thus, a particular quantity of NOx in the engine exhaust can, under conditions of an enhanced NO2 regeneration, be effective to oxidize more soot than an equilibrium-limited NO2 supply.

U.S. Patent Application Publications US2011/0000190A1 and US2010/0326055A1 explain that, in NO2-based regeneration testing, a measurement of NO2 efficiency, which is related to the reaction stoichiometry of NO2 and C, is introduced to evaluate the effectiveness of a particular method. The NO2 efficiency is expressly defined as the mass of C removed from the DPF divided by the mass of NO2 provided to the DPF, determined over a time period that is significant with respect to, but not exceeding, the time required to effectively regenerate a substantially full DPF. Conventional wisdom for conventional NO2-based regeneration dictated that NO2 efficiency would not significantly exceed 12.01 gC/46.01 gNO2=~0.26 gC/gNO2. The unit "gC" is the mass of soot removed from the DPF and the unit "gNO2" is the mass of the accumulated equilibrium-limited NO2 supply. Even more so, it was assumed that at elevated temperatures (near or just beyond the NO—NO2 conversion plateau) total NO2-based soot oxidation activity would fall significantly as the increasingly smaller equilibrium-limited NO2 supply would not be able to take advantage of the increased temperatures. In other words, increasing temperatures would simply lower NO2 supply and result in a more diffusion-limited reaction, therefore lowering the reaction rate, and thereby achieving lower total soot removal. Conventional passive NO2-based regenerations have NO2 efficiencies considerably less than 0.52 gC/glMO2, and more commonly less than 0.26 gC/gNO2, over a time period that is significant with respect to, but not exceeding the time required to regenerate a substantially full DPF.

U.S. Patent Application Publications US20110000190A1 and US2010/0326055A1 explain that, by actively increasing reactant temperature, significantly better soot removal results can be achieved than with conventional NO2-based regeneration techniques, with NO2 efficiencies of well above 0.52 gC/gNO2, ordinarily multiples above that efficiency. This is achieved by increasing the soot removal capacity of the NO2, with the objective of enhancing the effective NO2 supply (and not necessarily the equilibrium-limited NO2 supply). While not wishing to be bound by theory, it is believed that the mechanism whereby the soot removal capacity of the NO2 is increased is the NO recycling mechanism. Within a catalyzed DPF given sufficiently long residence times and sufficiently high temperatures, an NO2 molecule which has reacted with soot and formed an NO molecule may then be recycled back into NO2, which may in turn participate in another soot oxidation reaction. This process may repeat itself as many times as the residence time, kinetic reaction rates of the soot oxidation and the NO oxidation reactions, soot availability, oxygen availability, and catalyst availability will allow.

According to an aspect of the present invention, a process is provided for regenerating an exhaust gas after-treatment device adapted to be fitted in an exhaust line of an internal combustion engine, wherein the exhaust gas after-treatment device is one of a particle filter and/or of a NOx reducing catalyst, characterized in that the process comprising the steps of:

a) setting the temperature of the exhaust gases at the particle filter within a first temperature range, preferably comprised between 420 and 550 degrees Celsius;

b) maintaining the temperature of the exhaust gases at the particle filter at the first temperature range during a first period of time;

c) after the first period of time, further gradually increasing the temperature at the particle filter to a second temperature range which is over 550° degrees Celsius.

The inventors have discovered that, among other things, by performing the regeneration in two stages where a first stage, which can be called active NO2 regeneration process, is performed at intermediate temperatures below those at which there is a substantial risk of uncontrolled regeneration if high-temperature, active O2 regeneration were to be performed, maximum soot loading levels of a DPF can be increased above the safe high temperature regeneration soot loading level above which it is no longer considered to be safe to perform an active O2 regeneration of the particle filter. For example, some filters and engine arrangements will continue to function adequately at soot loading levels of the particle filter up to about 1.5 to 2 times higher than the safe high temperature regeneration soot loading level, however, maximum loading levels may vary for a variety of different factors.) Thus, this first stage of a regeneration process facilitates less frequent regenerations, and less frequent interruption of use of a vehicle including the engine and EATS. Nevertheless, in a second stage, the regeneration process involves an active O2 regeneration, performed at high temperatures, typically above 550° C. and preferably above 600° C., process by which remaining soot in the particle filter is substantially completely remove in a limited amount of time. In case a NOx reducing device, such as a NOx reducing catalyst, is located downstream of the particle filter, the second stage of the process allows simultaneous de-poisoning of the NOx reducing device. The two stage process according to the invention therefore allows less frequent regenerations while nevertheless optimizing the time needed to achieve a substantially complete regeneration of the particle filter where the soot loading level is brought back to a minimum level.

According to other aspects of the invention:

during step c), the temperature at the particle filter can be increased at a controlled rate of temperature increase over time, so as to further increase safety of the regeneration by further safeguarding against the risk of a run-away reaction in the particle filter, which could be due to uncontrolled oxidation of excessive amounts of soot. Since the temperature at the particle filter increases over time, it is equivalent to consider a controlled rate of temperature increase over time or a controlled rate of temperature increase increases over the temperature itself.

during step c), the temperature at the particle filter is increased at a controlled rate of temperature increase over time which is controlled as a function of a soot loading determination of the particulate filter, so that a better compromise can be achieved between the safety of the regeneration and its duration. Especially the temperature at the particle filter can be chosen to be increased at a rate of temperature increase over time which decreases over time and/or over the instant temperature at the particle filter.

during step c), the temperature at the particle filter may be increased at a variable rate of temperature increase over time, the variation of which is controlled as a function of the soot loading determination of the particle filter, for example at the end of the first period of time. This allows further optimization of the safety/duration compromise. For example, during step c), the temperature at the particle filter may be increased in at least two sub-steps:

in a first sub-step c1) at a first rate of temperature increase over time;

in a second sub-step c2) at a second rate of temperature increase over time, where the second rate is preferably lower than the first rate.

In some embodiments, the second rate of temperature increase over time during the second sub-step c2) is adjusted at a higher value when soot loading of the particle filter is estimated at a lower value, as an implementation of a variable rate of temperature increase over time.

In some embodiments, the soot loading of the particle filter can be an estimated soot loading, for example by using a soot loading model for the particle filter, because precise measurement of the soot loading might be difficult and/or expensive to implement in an operating environment. One parameter for estimating the soot loading may be the duration of the first period of time of step b). To have a more precise estimation, the soot loading may be estimated depending on the duration of the first period of time of step b) and depending on an estimated soot loading at step a). Alternatively, or in combination, the soot loading maybe estimated depending on a measured pressure difference between at an inlet and at an outlet the particle filter. Alternatively, or in combination, the soot loading may be estimated using an engine out soot emission model that estimates the soot emitted by engine as a function of engine operating parameters, and using a soot regeneration model that estimates soot oxidation in the particle filter based on operating conditions at the particle filter. Such model can lead to a more precise estimation of the soot loading.

In some embodiments, the process may be used to de-poison a NOx reducing device. It may then comprise, prior to the step a), a step of detecting a regeneration trigger which comprises estimating the NOx reducing device is poisoned.

In some embodiments, the preferred first temperature range may be between 450 at 510 degrees Celsius.

In some embodiments; the step of gradually increasing the temperature at the particle filter to a second temperature range may comprise increasing the temperature at the particulate filter up to over 600° C., for example up to around 620 to 625, or even up to 640°.

In some embodiments, the temperature at the particle filter may be maintained within the second rage during a second period of time.

According to another aspect of the present invention, a process is provided for regenerating an exhaust gas after-treatment device in an exhaust line of an internal combustion engine arrangement, the exhaust line including a particle filter, the process comprising detecting a triggering event indicative of a need for regeneration of the exhaust gas after-treatment device; determining that soot loading of the particle filter has exceeded a safe high temperature regeneration level, setting and maintaining temperature at the particle filter with in a first temperature range during a first period of time until at least one of a predetermined period of time has lapsed, and a determination has been made that soot loading of the particle filter is below the safe high temperature regeneration level; and following the first period of time, increasing the temperature at the particle filter to within a second temperature range above the first temperature range.

According to another aspect of the invention, a process is provided for regenerating an exhaust gas after-treatment device in an exhaust line of an internal combustion engine arrangement, the exhaust line including a particle filter, the process comprising maintaining at the particle filter within a first temperature range during a first period of time;

after the first period of time, increasing the temperature of the exhaust gases at the particle filter to within a second temperature range above the first temperature range, wherein, following the first period of time, increasing the temperature at the particle filter to within a second temperature range above the first temperature range comprises controlling a rate of increase of the temperature of the exhaust gases at the particle filter from the first temperature range to the second temperature range.

According to another aspect of the invention, an internal combustion engine arrangement is provided, comprising:

an internal combustion engine, an exhaust line for collecting the exhaust gas from the engine and conducting the exhaust gas towards the atmosphere;

an exhaust after-treatment system in the exhaust line, the exhaust after-treatment system comprising at least a particle filter, heating means arranged to increase a temperature at the particle filter; and a controller for controlling the heating means characterized in that the controller is arranged perform a process as described above.

According to a further aspect of the invention, a vehicle is provided which comprises an internal combustion engine arrangement having any of the above features, and/or arranged for performing a process according as defined above.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
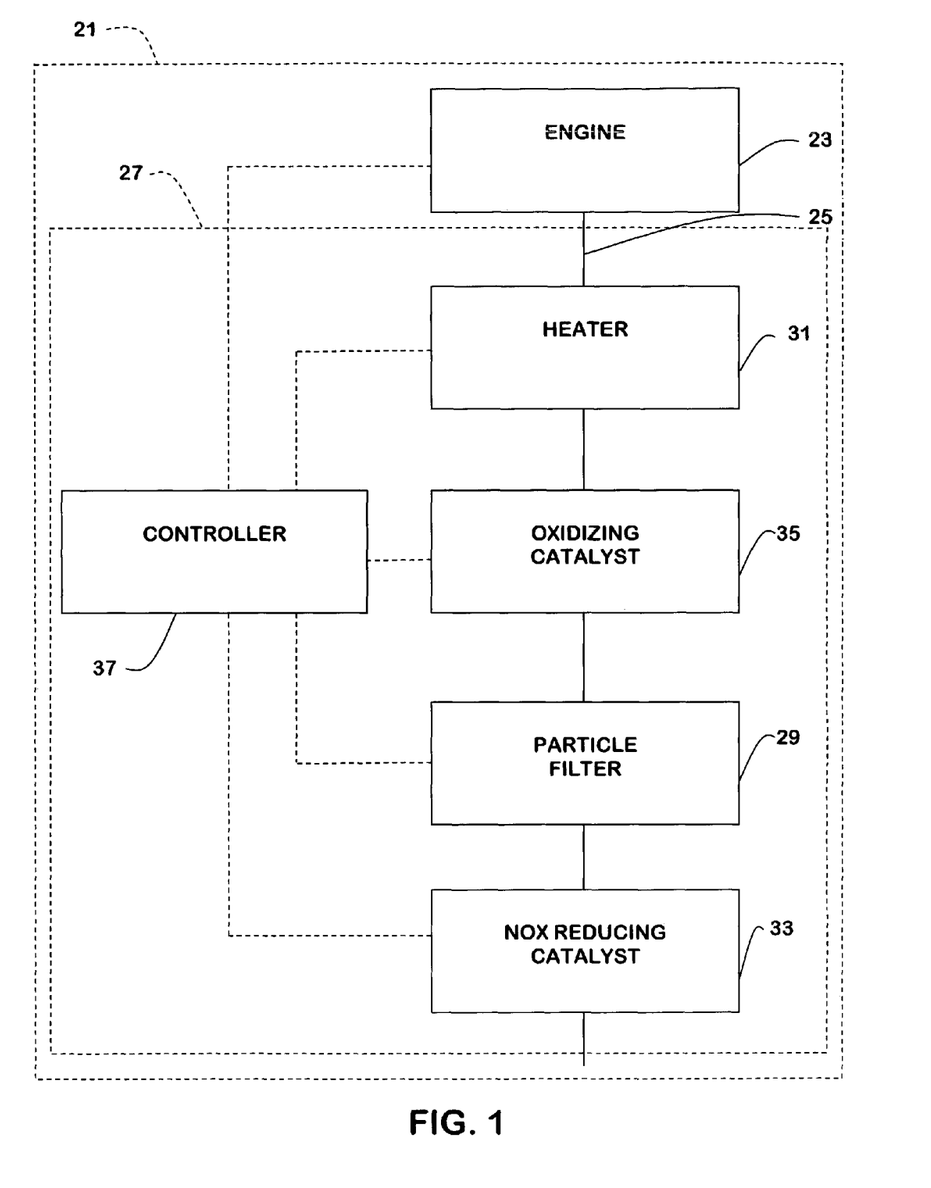
FIG. 1 is a schematic view of an internal combustion engine arrangement according to an aspect of the present invention.

An internal combustion engine arrangement 21 according to an aspect of the present invention is shown in FIG. 1. The arrangement 21 includes an internal combustion engine 23 comprising an exhaust line 25 which collects the exhaust gas from the engine and leads at least most of the exhaust gases to the atmosphere. An exhaust after-treatment system (EATS) 27 is installed in the exhaust line 25 so that the exhaust gases which are lead through the exhaust line 25 towards the atmosphere pass through the various components of the EATS 27 before being released to the atmosphere. The EATS 27 comprises a particle filter 29. Heating means are provided in the arrangement for increasing the temperature at the particle filter 29. Typically such heating means can comprise a heater 31 arranged to increase a temperature of exhaust gas at the particle filter. The EATS 27 can also include a NOx reducing device 33 (typically a NOx reducing catalyst such as a so-called selective catalytic reduction catalyst (SCR) or a NOx trap) downstream of the particle filter 29. The EATS may also comprise an oxidation catalyst 35 upstream of or forming part of the filter.

The present invention will be described primarily in connection with its application with a diesel engine as the internal combustion engine 23, however, it will be appreciated that internal combustion engines other than diesel engines might be provided. Instead of or in addition to providing an oxidation catalyst 35 (in a diesel engine arrangement, typically referred to as a diesel oxidation catalyst (DOC)) upstream of the particle filter 29 (in a diesel, engine arrangement, typically referred to as a diesel particulate filter (DPF)), the particle filter can include a catalyst that oxidizes CO and NO and converts them to $CO_2$ and $NO_2$ (herein referred to as a coated DPF). Different arrangements for providing oxidation catalysts include a DOC with an uncoated DPF (so called CRT systems), DOC with a coated DPF (so called cCRT systems), and coated DPF. At least a coated DPF is ordinarily preferred.

For purposes of discussion, the present invention will be described in connection with arrangements in which:

Exhaust gas temperatures exiting a warmed-up diesel engine are ordinarily in the range of about 250-350° C.

At such temperatures, so-called "passive" $NO_2$ regeneration of a particle filter can occur, particularly with the aid of a DOC or a catalyzed particle filter, mostly involving a reaction between $NO_2$ and C to form NO and $CO_2$. Typically, a minimum 250° C. and NOx/soot of 20 (preferably 50) is required to have a significant rate of the reaction ($2NO_2+C=CO_2+2NO$). The average exhaust temperature ordinarily depends on the application type. For example, a long haul truck exhaust temperature will ordinarily be above 300° C., while exhaust temperature for a bus in a city center might be below 200° C. An engine might also be operated in a "heat mode" to cause temperatures to be in the range of 250-350° C., however, engine heat mode is ordinarily not used all the time. In general, if exhaust gas temperatures are below 250° C., passive regeneration is very low, and, when exhaust gas temperatures are below 200° C., there is substantially no passive regeneration.

More rapid "active" $NO_2$ regeneration occurs at generally higher temperatures, such as temperatures in a range of about 420-550° C., preferably between 450-510° C. It is believed that the "enhanced" $NO_2$ regeneration which has been theorized in U.S. Patent Application Publications US2011/0000190A1 and US2010/0326055A1, which are incorporated by reference, form part of a broader family of active $NO_2$ regeneration. Typically, "active" $NO_2$ regeneration according to the present invention is believed to be achieved with or without the use of a catalyst coated particle filter. Nevertheless, it is believed that "active" $NO_2$ regeneration, as defined in the present invention by its temperature ranges, will benefit greatly from the use of a catalyst coated filter, by increasing the rate of reaction of $NO_2$ with soot, thereby considerably increasing the regeneration efficiency. An optimized regeneration temperature can be selected by taking into account the way in which the energy needed to heat the exhaust is produced. If hydrocarbon oxidation in DOC is used to create exotherm, then the $NO_2$ production might be affected (competition between the NO oxidation and hydrocarbon oxidation into DOC), the impact being highly dependent an the quantity of hydrocarbon oxidized. Therefore, a trade-off in terms of regeneration temperature, $NO_2$ formation, and carbon oxidation will typically have to be made. It can also be mentioned that active $NO_2$ regeneration according to the present invention can be performed without altering the engine operating conditions as to the amount of NOx produced by the engine. Of course, active $NO_2$ regeneration may nevertheless be implemented together with altered engine operating conditions, especially in view of increasing NOx production in the engine.

Even more rapid "active" $O_2$ regeneration during which substantially all of the soot is removed by reaction with $O_2$ occurs at temperatures above about 600° C., typically between 600-625° C. If it is necessary or desirable to remove all soot in a rapid event then, ordinarily, temperatures more than 600° C. may be needed. However, starting from about 550° C., there tends to be a significant rate of carbon oxidation by oxygen which is enhanced if a catalyzed filter is used. $O_2$ regeneration ordinarily starts at temperatures higher than 500° C. (while active $NO_2$ regeneration is also occurring), with significantly increased rates of $O_2$ regeneration at higher than 550° C., and with a final temperature at T>600° C. in order to remove all soot, particularly in a short duration event.

At temperatures above about 550° C., and even at lower temperatures such as 500° C., there is a substantial risk of uncontrolled or "runaway" regeneration of a filter, particularly as soot loading of the filter rises above the safe high temperature regeneration level. Accordingly, at soot loads above the safe high temperature regeneration level, it is preferred not to perform active regenerations or to do so only under highly controlled conditions, for example while the vehicle equipped with the arrangement is parked.

A typical particle filter will continue to function adequately at soot loading levels of around 1.5 to 2 times the safe high temperature regeneration level.

It will be understood that the specific temperatures and soot loading levels noted above are merely illustrative and are used herein for purposes of discussion. It must be emphasized that the levels of soot loading are merely approximations of loading levels at which risk of uncontrolled regeneration becomes too high for 02 regeneration or maximum loading of the filter for some, but not necessarily all filters, and that the actual values for a particular filter may be substantially different, and depend upon factors such as the material from which the filter is made (e.g., cordierite, SiC, etc) and on application. It will also be appreciated that different engine arrangements and EATS may perform passive, active, and active regenerations at different temperature ranges, and the soot loading levels at which there is considered to be substantial risk of runaway regeneration or at which performance of the particle filter is compromised may be different.

The internal combustion engine arrangement 21 also includes a controller 37 arranged to control the heating means or heater 31. The heater 31 can involve any suitable ones of a number of different types of structures or combinations of structures and methods, such as, but not limited to:

regular fuel injectors (not shown) that inject fuel into the combustion chamber (not shown) but that are controlled to inject fuel during the exhaust stroke of engine or late in the power stroke so that the fuel is not combusted or not entirely combusted in the chamber plus an oxidation catalyst (e.g. a DOC, or a particle filter with coated catalyst) where fuel is oxidized with heat generation, control of specific engine operating parameters such as intake air throttling and injection timing to increase the temperature of the gases coming out of the combustion chamber (not shown) of the engine 23.

In those above cases, the heater or heating means are directly connected to the internal combustion engine itself. In other cases such as listed below, the heater or heating means may be a component of the EATS and may comprise:

dedicated fuel injectors (not shown) in the exhaust line (sometimes referred to as "after-treatment hydrocarbon injectors" (AHI), "seventh injectors", or "fuel dosers") plus an oxidation catalyst (DOC or particle filter with coated catalyst) where fuel is oxidized with heat generation, a fuel burner in the exhaust line to which fuel and air are brought to create a flame, an electric heater before and/or around and/or in the particle filter, microwave arrangements that direct microwaves onto the particle filter.

The heater or heating means may also comprise some combination of the above structures and methods.

For purposes of illustration, the heater 31 is illustrated as a discrete component disposed in the exhaust line upstream of the oxidation catalyst 35 and the particle filter 29, however, it will be appreciated that the heater may comprise several components working together and may involve a structure or structures disposed in locations other than that illustrated.

The controlled 37 will typically be part of or will typically comprise on or several electronic control units (ECUs). The controller can be dedicated to the heating means or be part of control controlling other components of the arrangement, or can be split between several physical entities. The controller can be an open-loop controller, or preferably a closed controller having the feedback a temperature sensor.

Ordinarily, the arrangement 21 will operate so that exhaust from the engine 23 is at a temperature of about 250-350° C. and passive regeneration of the particle filter 29 occurs, typically aided by an oxidation catalyst 35 upstream or on the particle filter. At low temperatures (<300° C.) the soot oxidation by N02 shows quite a low rate and therefore the soot loading could increase quite quickly in case of severe duty cycles (cold unloaded cycles).

Soot loading may be stabilized for an operation temperature or a duty cycle, i.e., a balance point may be reached. This is highly dependent on operation temperature and the soot loading could be more or less high. As seen by line A in FIG. 2, this balance or equilibrium level may be at a soot loading level below the level at which it is considered to be safe to perform an active 02 regeneration of the particle filter, i.e. the safe high temperature regeneration level SL SHT. On some duty cycles of the engine arrangement, the soot loading could even at certain times decrease by mere passive N02 regeneration, and/or fluctuate while staying for example below said safe level for performing high temperature regeneration. However, as seen by lines B and C in FIG. 2, often, after a period of operation, soot loading of the particle filter at least rises above the said safe level for performing high temperature regeneration SL SHT, i.e. the soot loading level at which it is considered to be safe to perform an active 02 regeneration of the particle filter.

Figure 2:
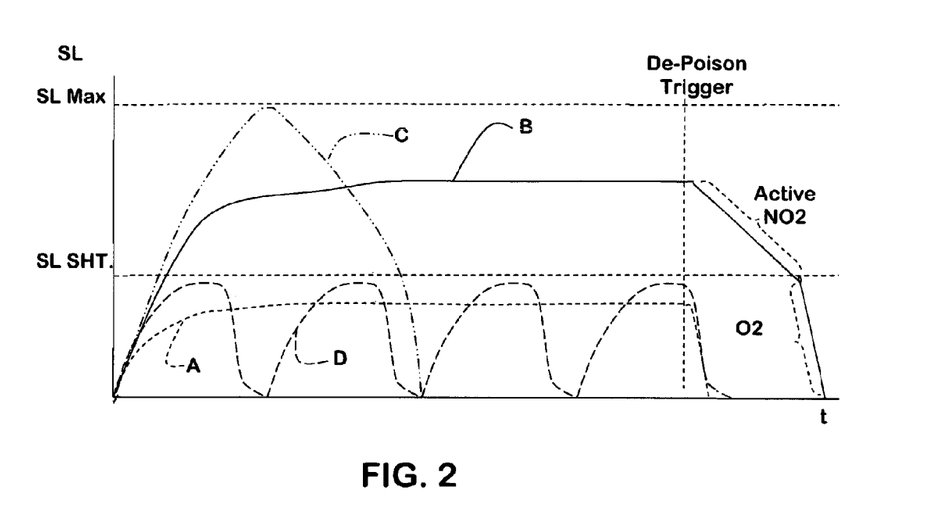
FIG. 2 is a graph of soot loading SL over time t for different types of particle filter regenerations.

In some cases, such as is seen by line B, soot loading levels rise to a level above the said safe level for performing high temperature regeneration SLSHT and then stabilize so that the amount of soot collected over a period of time more or less equals the amount of soot that is removed by passive regeneration. In these cases, it may be unnecessary to perform an active regeneration of the particle filter unless it is necessary to raise the temperature of the EATS 27 for some other purpose, such as to "de-poison" a component such as a NOx reduction catalyst 33.

In other cases, such as is seen by line C, soot loading continues to rise, i.e., equilibrium or balance is not reached, or the particle filter reaches a target maximum soot loading SL MAX (typically 1.5 to 2 times higher than the safe high temperature regeneration level) at which point the soot buildup has reached such a level that the risk of filter damage by increasing soot load is considered significant, or where the impact on the engine of the increasing backpressure starts to become significant. If the passive regeneration is unable to keep the soot loading below this level, active measures are needed to remove the soot.

Previously, because of the danger of uncontrolled regeneration at soot loading levels above safe level for performing high temperature regeneration SLSHT, an active 02 regeneration would be performed when soot loading levels approached that level. This meant that, even though the particle filter was functioning adequately and there was no present need to increase temperature in the EATS above the temperature at which there was an unacceptable risk of uncontrolled regeneration, it was nonetheless necessary to frequently perform 02 regenerations. This is shown by line D in FIG. 2. Each 02 regeneration involved cycling the temperature of the filter or the exhaust gas at the particle filter to around 600-625° C. or higher. This cycling tended to increase wear on the particle filter, and also to involve substantial use of energy to heat the exhaust gas or filter.

According to an aspect of the present invention, the need for frequent 02 regenerations can be reduced or avoided, and soot loading levels can be maintained at substantially higher levels than would be advisable if the only way to regenerate the filter were via an 02 regeneration. According to this aspect of the invention, when soot loading of the particle filter 29 exceeds a predetermined level, particularly, the level at which there is considered to be an unacceptable risk of uncontrolled regeneration, may be identified. After exceeding this level, if more than passive regeneration is desired, the controller 37 is arranged to control the heater 31 to maintain temperature at the particle filter within a first temperature range, i.e., the temperature range at which active N02 regeneration occurs, which the inventors consider to be between about 420 and 550° C., and preferably between 450-510° C. in the example of an engine arrangement as described. This may of course involve first increasing the temperature up to that first range. The controller 37 controls the heater 31 to maintain this first temperature range until a determination is made that soot loading in the particle filter 29 is below the safe level for performing high temperature regeneration. Except where otherwise indicated, references to the expressions "temperature at the particle filter" or "temperature of the exhaust gases at the filter" are expressly defined herein as meaning not only temperatures of the exhaust gases, usually at the inlet to the particle filter, but should further be broadly construed to cover temperatures of, inter alia, the particle filter itself, regardless of the temperature of the exhaust gases, such as when the heater heats the particle filter, rather than the exhaust gases. The temperature can be measured at the inlet of the temperature or be considered as a mean temperature of the filter or of the gases going through the filter.

After temperature at the filter has been maintained within the first temperature range and the second determination (that soot loading is below the level at which there is considered to be an unacceptable risk of uncontrolled regeneration) has been made, the controller 37 then controls the heater to further increase the temperature at the particle filter 29, for example for increasing the temperature of the exhaust gas, to within a second temperature range above the first temperature range, i.e., the temperature range at which 02 regeneration occurs. The inventors consider this second temperature range to be the temperatures above 550° C. Ordinarily, an upper limit of this range will be the typical upper limits of temperature ranges of safe operation of the various EATS components. At this second temperature range, regeneration of the particle filter 29 can and ordinarily is performed until there is substantially no soot load. In addition, or as an alternative to performing regeneration until there is substantially no soot load, the controller 37 can be arranged to control the heater 31 to maintain the second temperature range so as to perform regeneration of other EATS components, particularly de-poisoning of the diesel oxidation catalyst 35 and/or the NOx reducing catalyst 33.

Ordinarily, some form of triggering signal will be provided to the controller 31 if more than passive regeneration is desired or necessary. Various means can be provided for providing the triggering signal to the controller 31 to begin raising the temperature of the exhaust gases to within the first temperature range in response to a triggering event indicative of a need for regeneration of an exhaust gas after-treatment device in the exhaust after-treatment system. The triggering event may, for example, be a determination that the particle filter has reached a target maximum soot loading. Alternatively, or in addition, a triggering event may be a determination that the oxidizing catalyst 35 and/or the NOx reducing device 33 are poisoned. The triggering event may alternatively, or in addition, be a determination that an accumulated engine operating parameter since a previous regeneration has exceeded a threshold, such as that some predetermined period of time of operating the engine arrangement 21 has elapsed.

Especially in the case where the triggering event is that the NOx reducing device 33 is poisoned, it may be interesting to make a specific determination as to whether the soot loading level has or not exceeded the safe high temperature regeneration level at which there is considered to be an unacceptable risk of uncontrolled regeneration. If the soot loading is above that level, then the controller will proceed as described above, in a two stage active regeneration, with an active N02 regeneration followed by a high temperature regeneration where the exhaust gases are brought to a level preferably above 600° C. at the particle filter. In this second stage, the gases received at the NOx reducing device should be at a temperature high enough to perform the de-poisoning of the NOx reducing device. At the same time, remaining soot in the particle filter will also be oxidized. If, at that triggering event, the determination is that the soot loading level in the particle filter is lower than the safe high temperature soot loading level, then the controller could control the heater to perform directly and only the second stage of the regeneration as described above, by increasing the temperature directly to the second range, preferably nevertheless in a controlled way.

The determination of the soot loading, especially the determination that the soot loading is above or has exceeded the safe high temperature regeneration soot loading level, i.e. the level at which there is considered to be an unacceptable risk of uncontrolled regeneration, can be an estimation, for example by modeling. A model will usually comprise a set of formulas, maps, charts, tables for calculating an estimated value (here of the soot loading the particle filter), without actually measuring the value. A model usually receives as inputs a number of variables, such as operating parameters of the engine arrangement, which can be measured through sensors or also be obtained by models, based on which the calculation is made. A preferred model can based on an engine out soot emission model that predicts the soot emitted by engine as a function of factors such as engine speed, torque, temperature, etc. (engine operation). In addition, passive an d/or active N02 regeneration and/or 02 regeneration can be taken into account for these engine operating points (temperature, flow). In this way, the soot loading tend to rise due to engine out soot emission and tends to decrease due to soot N02 oxidation (and 02 oxidation at temperatures more than 500° C.). Such a model determines soot loading as a theoretical prediction of how the filter is loaded at any engine operating point, and what is the soot loading of the particle filter at a certain point in time. Such a soot model can be combined with other triggers/parameters such as a model based on differential pressure across the DPF, fuel consumption, and/or time from the previous regeneration. The soot model can also determine when maximum soot loading should have been reached and, upon that or an analogous determination, can trigger what can be referred to as a first stage regeneration, i.e., active N02 regeneration. A determination by the soot model that the soot loading level below which it is considered safe to perform 02 regeneration should have been reached, can then trigger what can be referred to as a second stage regeneration, i.e., 02 regeneration.

Alternatively, simple models may involve nothing more than a total amount of fuel consumption since a last complete regeneration, elapsed time of operation since the last regeneration, and/or pressure drop across the particle filter 29, and/or a combination thereof. For example, the determination that soot loading is at or above a target maximum soot loading can be made by modeling, such as a model based on pressure drop across the particle filter. As another example, the determination that soot loading in the particle filter 29 has fallen below the predetermined level at which there is considered to be an unacceptable risk of uncontrolled regeneration after maintaining exhaust gas temperature at the particle filter at the first temperature range at which active N02 regeneration occurs can be made by modeling, such as a model based on the length of time that temperature is maintained within that temperature range. More complex models may also be provided, however, the foregoing are merely illustrative of the forms of models that might be used to determine soot loading for different purposes.

Also, models for determining the soot loading of the particle filter could take into account the behavior of other components of the engine arrangement, for example, of the DOC. For example, the soot model might be further improved by introducing special equations/maps that take into consideration further factors such as the impact of a quantity of hydrocarbon injected (e.g., for heating of the DOC, if an AHI is used) to the N02 formation. The hydrocarbon oxidation (that is exothermal) and NO oxidation to N02 are in competition in the DOC. That means that, if there is a cold cycle (low exhaust temperatures), in order to reach high temperatures, it will be necessary to inject more hydrocarbons into the DOC to create high temperatures. Therefore less N02 will be formed, which will lead to a less efficient N02 active regeneration, and therefore to a higher soot loading at point 4. This HC impact allows the soot model to be more precise, especially when fuel dosers such as AHI and 7th injectors are used. In other words, the soot loading may be estimated taking into account the rate and/or efficiency at which NO is converted into N02 in a catalyst upstream of the particle filter.

Figure 3:
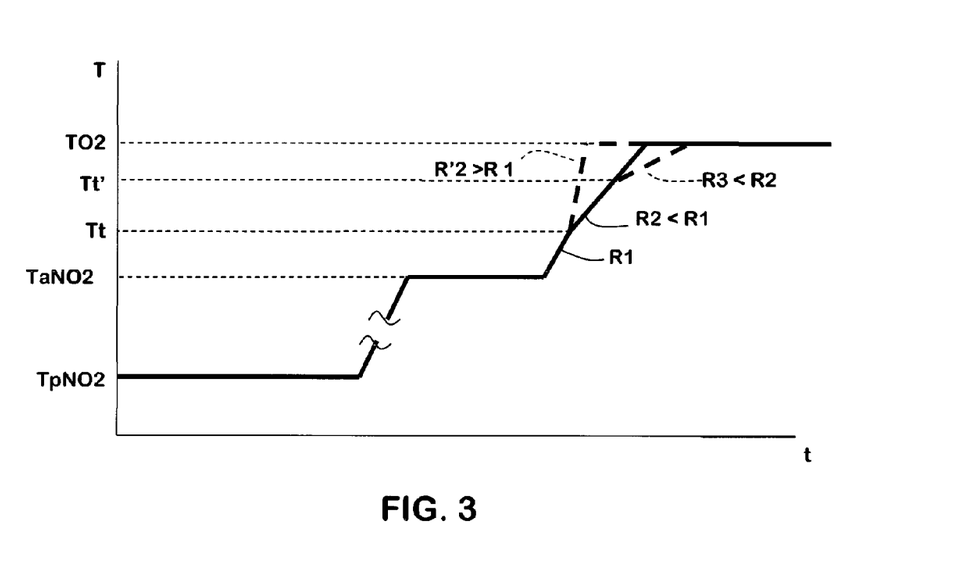
FIG. 3 is a graph of temperature T at the particle filter during regeneration over time t according to aspects of the present invention.

In addition to controlling the heater 31 to increase the temperature of the exhaust gases to or maintain the gas temperatures at particular temperature ranges, the controller 37 can be arranged to control the heater to control a rate of increase of the temperature of the exhaust gases from the first temperature range to the second temperature range. This can be useful to permit optimization of the rate of fuel consumption during the 02 regeneration, and to reduce the risk of uncontrolled regeneration. For example, as seen in FIG. 3, after controlling the heater 31 to heat the exhaust gas from a temperature TpN02 that may be, e.g., normal exhaust temperature at which passive N02 regeneration may occur, to a temperature TaN02 at which active N02 regeneration occurs, the controller 37 can be arranged to control the heater to heat the exhaust gas to a temperature T02 at which active 02 regeneration is the primary regeneration mechanism. While heating from TaN02 to T02 could be uncontrolled, by just trying to reach a temperature target, the controller is preferably able to control the rate of increase of temperature at the particle filter over time, for example by making sure that to make sure the temperature at the particle filter over time follows a predetermined line or curve, or at least remains within certain boundaries around such line or curve. In a simple form, the controller may control the increase of temperature at the particle filter at a predefined rate which may be for example along a straight line, i.e. representing a linear increase of temperature versus time.

Preferably, the controller 37 controls the rate of temperature increase as a function of soot loading of the particle filter 29. For example, the controller may be arranged to control the rate of temperature increase as a function of soot loading of the particle filter 29 as it is determined at the end of the first stage of the regeneration as described above. For example, if the soot loading of the particle filter is determined to be below but close to the safe high temperature soot loading level, the controller may be arranged to control a globally slower rate of increase of the temperature at the particle filter, than if the determination would have found a lower soot loading at the end of the first stage.

In addition, or in combination with the above, the controller 37 may be arranged, for example, to control the heater 31 to control the rate of increase of the temperature of the exhaust gases so that the temperature at the particle filter is increased at a rate of temperature increase over time which decreases over time and/or over the instant temperature at the particle filter. For example, the controller can be arranged to, first, increase the temperature of the exhaust gases at a first rate of increase (Rate R1) up to a transition temperature Tt, for example 570° C., and, subsequently, to increase the temperature of the exhaust gases at a second rate of increase (Rate R2) that is different from the first rate of increase, wherein the second rate of increase is lower than the first rate of increase. Each of the first rate and of the second rate could be constants, representing two successive linear increases, or could be each themselves variable over time. The rate of increase can be changed more than once, such as by further decreasing the rate of increase at a further higher transition temperature Tt', for example 600° C., to a rate (Rate R3—shown by dashed line) that is less than the second rate of increase, or can change continuously so that the temperature follows a curved line, at least along a portion of the temperature increase step.

It is presently contemplated that it will ordinarily be desirable to decrease the rate of increase of temperature as higher temperatures are reached to reduce the risk of uncontrolled regeneration as 02 regeneration becomes more efficient, such as at temperatures above about 550° C. However, the controller 37 might also be arranged to control the heater 31 to increase the rate of increase of the exhaust gases at the first rate of increase (Rate R1) that is slower than a second rate of increase (Rate R2'—shown by dashed line) in a subsequent portion of the increase of temperature to T02. It may, for example, be possible to achieve a fuel savings by more rapidly increasing temperature, particularly when soot loading is sufficiently low such that the risk of uncontrolled regeneration is minimal. While FIG. 3 shows temperature increases along straight lines, it will be appreciated that the temperature increases need not be along straight lines, i.e., the lines may be curved so that temperature increases at a decreasing rate (or increasing rate, if desired) from one temperature level to the next. Also, as in an controlled process, the real measured temperature could show a slight deviation from the theoretical control target.

Preferably, the temperature at the particle filter is increased from the first rage to the second stage of temperatures, at a controlled rate of temperature increase over time. Since the temperature at the particle filter increases over time, it is equivalent to say that the controlled rate of temperature increases over time or increases over the temperature itself.

Preferably, said controlled rate is controlled as a function of a soot loading determination of the particulate filter, for example at the end of the first stage of the regeneration. Preferably, said rate decreases over time and/or over the instant temperature at the particle filter.

The method and arrangement lend themselves to a variety of soot reduction strategies. According to a first strategy according to an aspect of the present invention, illustrated in FIG. 4A, a maximum soot loading level can be determined, e.g., by a suitable soot model, which triggers the controller 37 to control the heater 31 to raise exhaust gas temperature at the filter to the temperature range TaN02 for active N02 regeneration (Point 1), also referred to here as $1^{st}$ stage regeneration, usually in the range of 420 to 550° C., preferably between 450 and 510° C., for example 490° C. The soot model may continue to evaluate soot loading and, when it is determined that soot loading has decreased and has reached a second trigger, preferably the soot loading levels below which it is considered safe to perform active 02 regeneration (e.g., 2 to 8 gC/l filter) then heating to the temperature range for active N02 regenerations ends (Point 2). At point 2, the controller 37 controls the heater 31 to raise temperature at the filter to the temperature range T02 for active 02 regeneration, also referred to here as $2^{nd}$ stage regeneration, i.e., increasing or substantially increased active 02 regeneration at higher than 550° C., with the $2^{nd}$ stage at T02>600° C. In a first phase, a temperature increase rate R1 may be used (rapid increase in temperature, such as between 0.4 and 5 degrees Celsius of temperature increase per second) and, when the temperature enters a transition temperature zone above Tt', preferably between 550 and 600° C., for example 570° C., where uncontrolled regeneration is an increased danger (there is an increased danger for filter integrity), the temperature increase rate changes to R2 (slower temperature increase, such as between 2 to 20, but preferably 5-15 times slower that the first rate R1). Temperature increase slope R2 is then used until a plateau is reached, usually at T02>600° C., and may be held at that level or $2^{nd}$ stage for a defined duration. Then the $2^{nd}$ stage regeneration is ended and the regeneration is considered to have been successful.

Figure 4A:
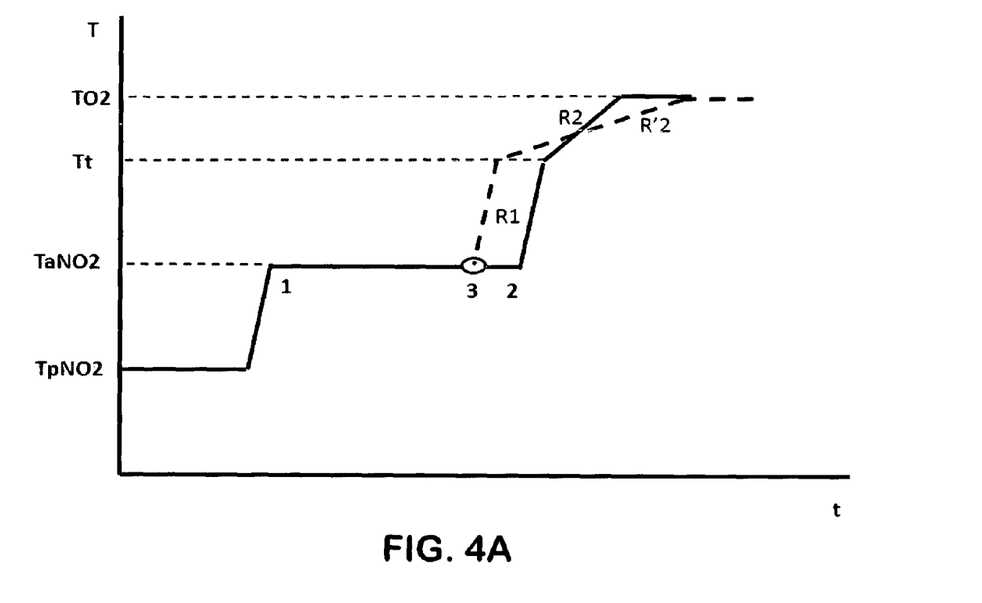
FIGS. 4A and 4B are graphs of temperature T at the particle filter versus time t according to different regeneration strategies according to aspects of the present invention.

In order to, for example, conserve fuel and/or avoid too long of a regeneration, a maximum duration for the $1^{st}$ stage can be set (point 3 in FIG. 4A). If point 3 arrives before point 2, meaning that the maximum duration for the $1^{st}$ stage regeneration is reached before point 2, i.e., the point at which soot loading levels are below the level at which it is considered safe to perform active 02 regeneration, that means that the soot loading in the filter is probably higher than the levels at which it is considered safe to perform active 02 regeneration. If that happens, and heating to the $2^{nd}$ stage begins and the R1 and R2 heating rate increase slopes are used, there is substantial risk of cracking of the filter. To maintain filter integrity, regeneration is aborted and an unsuccessful regeneration is counted. The soot model in this case prevents performance of the $2^{nd}$ stage active 02 regeneration to preserve the filter from damage.

In a variant, the criteria for switching from the first temperature range TaN02 to the second temperature range T02 could be to set a maximum duration of the first stage that is sufficiently long so that, according to probability, if it is reached, it can be determined without any further estimation that the soot loading level in the particle filter is lower than the safe high temperature soot loading level. In such a case, the regeneration can proceed to the second stage of the regeneration based solely on the fact that this maximum duration has been reached.

A second strategy according to an aspect of the present invention is something of a modification of the first strategy and is illustrated in FIG. 4A. Aborted regenerations will generally lead to a fuel penalty due to a repeated series of attempted regenerations that will each perform the $1^{st}$ stage, i.e., active N02 regeneration, as well as accelerated aging and may also lead to a request for parked regeneration. Instead of aborting the regeneration as in the first strategy, according to the second strategy, if point 3 is reached (maximum duration for $1^{st}$ stage regeneration) and soot loading is not determined to have decreased to the level at which it is considered safe to perform 02 regeneration (point 2), the regeneration may be continued but increases temperature at a slower rate using another slope. For example, the temperature may be increased at the first rate along slope R1 (dashed line) as during a normal regeneration, but temperature will be increased at a slower rate at higher temperatures along a slope R'2 (dashed line), where R'2 is lower than the rate R2 which would have been used if the soot loading would have been determined to have decreased to or below the level at which it is considered safe to perform 02 regeneration. Different rates of temperature increase R'2 might be established as a function of the soot loading determined when point 3 is reached.

The temperature at the particle filter may be increased at a variable rate of temperature increase over time, the variation of which is controlled as a function of the soot loading determination of the particle filter. This determination can be made at the end of the first period of time, i.e. at the end of the first stage of the regeneration. The variation of the rate of increase results in the temperature increase not being linear over time when it is increased from the first range to the second range.

In this second strategy, the time necessary to reach the temperature range for 02 regeneration at the $2^{nd}$ stage is longer but, at the end, a successful regeneration will be counted and repeated performances of active N02 regeneration along the $1^{st}$ stage can be avoided.

The second strategy can be particularly useful in the case of de-poisoning (de-sulfurization) of an SCR without a delay, i.e. when a trigger event for the regeneration is a regeneration trigger which comprises estimating that the NOx reducing device is poisoned. As the de-poisoning typically requires T>600° C., regeneration at the $2^{nd}$ stage is mandatory. If strategy 1 is used, there is a risk that, by delaying the de-sulfurization, the SCR will start to have a significant decrease of efficiency and, therefore, a parked or service regeneration might be requested that will require the immobilization of the vehicle.

Figure 4B:
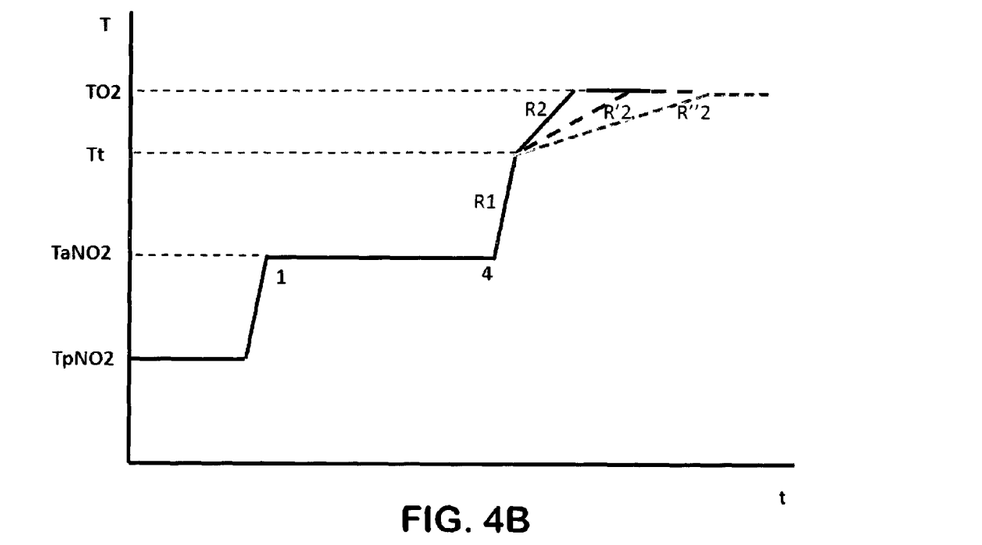

According to a third strategy, illustrated in FIG. 4B, a fixed duration for the $1^{st}$ stage active N02 regeneration can be provided. When a soot model determines that a trigger such as maximum soot loading has been reached, then temperature is raised to TaN02 to perform active N02 or $1^{st}$ stage regeneration starts (point 1). The active N02 regeneration is of a fixed duration that corresponds to point 4 in FIG. 4B. The soot model can then calculate the soot loading in filter when point 4 is reached (after a fixed duration). Depending upon the soot loading determined at point 4, temperature can be increased to T02 for active 02 or $2^{nd}$ stage regeneration along different slopes, i.e. different rates of temperature increase could be used. An initial rate of temperature increase R1 might be kept the same up to a transition temperature Tt, regardless of soot loading (for example similar to rate R1 from FIG. 3a), but subsequent rates of temperature increase up to T02 may have different values R2, R'2 or R"2. For example, if soot loading is low at point 4, then a high temperature increase rate might be used (R2). If soot loading is high at point 4, then slower temperature increase rates should be used (R'2 or R"2). Of course, any number of different rates of temperature increase after R1 might be provided. Also, of course, the entire slope from TaN02 to T02 may be sloped differently as a function of soot loading, including the first portion at rate R1. According to this third strategy, fuel consumption can be optimized and aging minimized because the regeneration will ordinarily be performed through to completion. The filter integrity can be improved, and the slopes of temperature increase rates can be developed to correspond to any particular level of soot loading.

Figure 5:
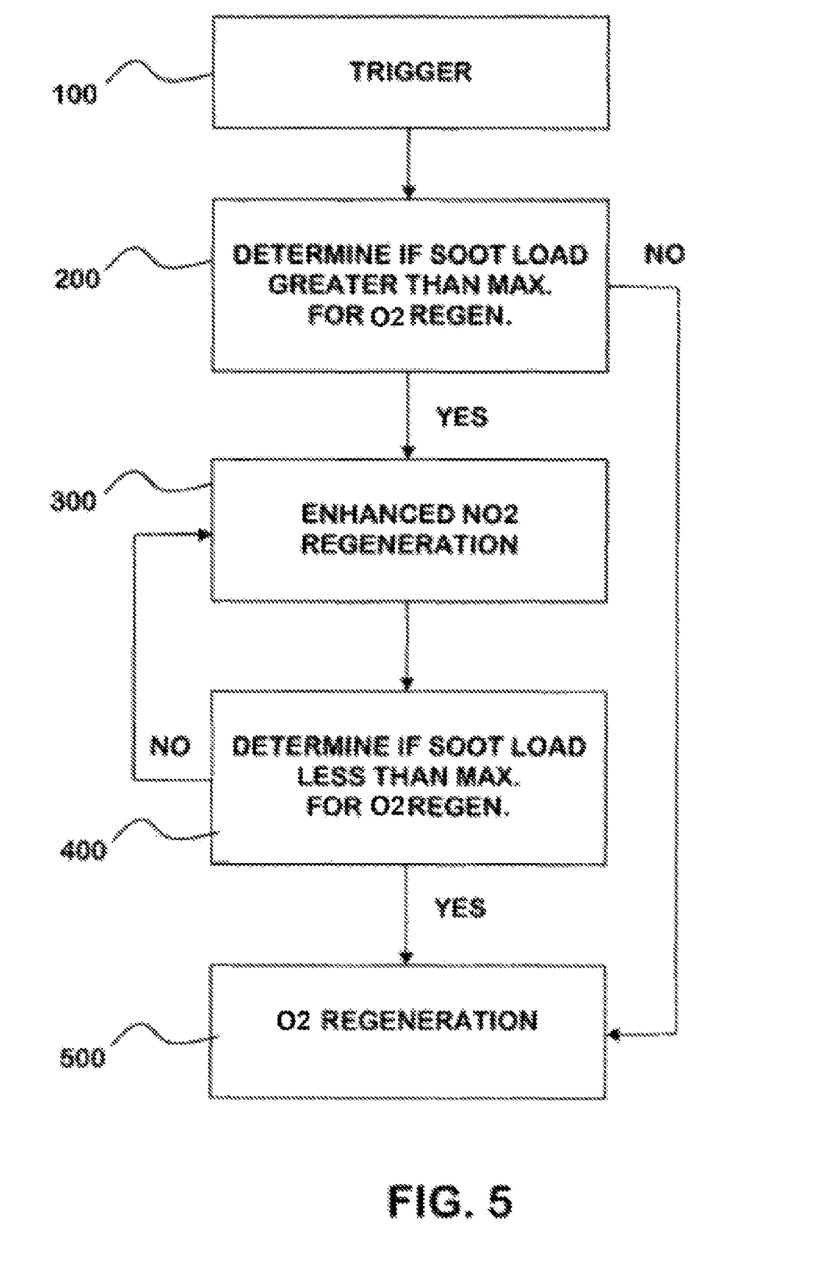
FIG. 5 is a flow chart showing steps in a method according to an aspect of the present invention.

Steps in a process for regenerating an exhaust gas aftertreatment device in an exhaust line are shown in FIG. 5 and are described in connection with the internal combustion engine arrangement 21 in FIG. 1. The after-treatment device can be a device such as the particle filter 29, the NOx reducing catalyst 33, and/or the oxidizing catalyst 35.

According to an optional step 200 of the method, which may especially be used when a regeneration triggering event is linked to the de-poisoning of the NOx reducing device, a determination can be made that soot loading of the particle filter 29 is above a predetermined level, ordinarily the level at which there is considered to be an unacceptable risk of uncontrolled regeneration, usually about 2-8 g C/l filter.

If step 200 is performed and if it is determined that soot loading of the particle filter is above the predetermined level, the controller 37 may control the heater 31 to maintain the temperature of exhaust gases at the particle filter within a first stage (FIG. 3) or temperature range, ordinarily at temperatures between 420 and 550° C. at which active N02 regeneration occurs (step 300), until, at step 400, a determination is made that soot loading in the particle filter is below the predetermined level. After temperature of the exhaust gases has been maintained within the first temperature range and the determination has been made that soot loading in the particle filter 29 is below the predetermined level, the controller 37 controls the heater 37 to increase temperature of the exhaust gases at the particle filter to a second stage (FIG. 3) within a second temperature range above the first temperature range, ordinarily a range above 550° C. at which active 02 regeneration occurs at step 500.

If it is desired to regenerate an after-treatment device, such as the NOx reducing device, in the EATS 27, and if it is determined at step 200 that soot loading is below the safe high temperature regeneration level, the controller 37 can control the heater 31 to raise temperature of the exhaust gases at the particle filter directly to the temperature at which active 02 regeneration occurs, i.e., above 550° C., skipping directly from step 200 to step 500.

The temperature of the exhaust gases can be raised to within the first temperature range in response to a triggering event, step 100, indicative of a need for regeneration of the exhaust gas after-treatment device. The temperature of the exhaust gases at the particle filter 29 is ordinarily raised from the temperature range of ordinary exhaust, usually around 250-350° C., at which temperature passive regeneration may occur. The triggering event may be the determination that soot loading of the particle filter 29 is at or above the target maximum soot loading, necessitating regeneration of the particle filter. The triggering event may, alternatively or in addition, be a determination that the NOx reducing catalyst 33 or the oxidizing catalyst 35 is poisoned. The triggering event may be a determination that an accumulated engine operating parameter since a previous regeneration has exceeded a threshold, such as the length of time since a previous regeneration, or the amount of fuel consumed since the previous regeneration.

The determination that soot loading is above a certain level may be made by modeling, such as a model that predicts soot emitted by the engine as a function of speed, torque, etc. and that predicts soot consumed, such as by passive or active N02 regeneration or by 02 regeneration. Other, simpler models may be based on factors such as the amount of fuel consumption, time since the last regeneration, or the pressure drop across the particle filter 29. Likewise, the determination that soot loading in the particle filter 29 has fallen below a certain level may be made by models such as those described above, or such as via a model based on the length of time that temperature of the exhaust gases at the particle filter is maintained within the first range.

When increasing temperature from step 300 to step 500, the controller 37 can control the heater 31 to control a rate of increase of the temperature of the exhaust gases from the first temperature range to the second temperature range. The rate of increase of temperature of the temperature of the exhaust gases can be controlled as a function of, e.g., soot loading of the particle filter, such as to minimize a risk of uncontrolled regeneration. The rate of increase may alternatively or in addition be controlled to optimize fuel consumption.

Temperature of gases at the particle filter 29 may be increased at a first rate (Rate 1—FIG. 3) for a first part of the increase, and at a second, slower rate (Rate 2—FIG. 3) for a second part of the increase, where the first rate and the second rate can correspond to straight lines or curved lines, i.e. to linear or non-linear increases over time. In other circumstances, temperature may be increased at the first rate (Rate 1) for a first part of the increase, and at a second, faster rate for a second part of the increase, as, and the increases may be along straight or curved lines. The rate of increase from the first temperature range to the second temperature range may be changed multiple times, such as by further decreasing the rate of increase to a rate (Rate R3) below the second rate (Rate R2), etc., or even may be changed continuously during the time or part of the time for increasing the temperature from the first range to the second range of temperatures.

The process as described above is typically carried out in an internal combustion engine arrangement, particularly an engine arrangement mounted on-board a vehicle. The two stage regeneration process according to the invention can be carried out when the vehicle is moving, even when the initial soot loading at the beginning of the regeneration process is above the safe high temperature soot loading level.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The invention claimed is:

1. A process for regenerating an exhaust gas after-treatment device adapted to be fitted in an exhaust line of an internal combustion engine arrangement, wherein the exhaust gas after-treatment device comprises a particle filter and the process oxidizes soot particulates trapped in the particle filter, the process comprising:
   determining an initial soot loading in the particle filter,
   performing a particle filter regeneration when the initial soot loading is above a predetermined level, wherein the particle filter regeneration comprises:
when the initial soot loading is above the predetermined level and further above a safe high temperature regeneration level,
   a) setting a temperature of exhaust gases at the particle filter within a first temperature range comprised between 420 and 550 degrees Celsius,
   b) maintaining the temperature of the exhaust gases at the particle filter at the first temperature range during a first period of time that is at least one of a predetermined period of time and a time sufficient to reduce soot loading to below the safe high temperature regeneration level, and
   c) after the first period of time, further increasing the temperature at the particle filter to a second temperature range which is over 550 degrees Celsius, and
when the initial soot loading is above the predetermined level but below the safe high temperature regeneration level, increasing the temperature at the particle filter to the second temperature range without first setting the temperature of exhaust gases within the first temperature range and without maintaining the temperature of the exhaust gases at the first temperature range for the first period of time.

2. A process according to claim 1, wherein, during step c), the temperature at the particle filter is increased at a controlled rate of temperature increase over time.

3. A process according to claim 1, wherein, during step c), the temperature at the particle filter is increased at a controlled rate of temperature increase over time which is controlled as a function of a soot loading determination of the particulate filter.

4. A process according to claim 1, wherein the temperature at the particle filter is increased at a rate of temperature increase over time which decreases over time.

5. A process according to claim 1, wherein, during step c), the temperature at the particle filter is increased at a variable rate of temperature increase over time, a variation of which is controlled as a function of a first period soot loading determination of the particle filter at an end of the first period of time.

6. A process according to claim 1, wherein, during step c), the temperature at the particle filter is increased in at least two sub-steps:
   in a first sub-step c1) at a first rate of temperature increase over time;
   a second sub-step c2) at a second rate of temperature increase over time,
   where the second rate is lower than the first rate.

7. A process according to claim 6, wherein the second rate of temperature increase over time during the second sub-step c2) is adjusted at a higher value when soot loading of the particle filter is estimated at a lower value.

8. A process according to claim 6, wherein the first rate of temperature increase over time during the first sub-step c1) is fixed.

9. A process according to claim 1, wherein the soot loading of the particle filter is an estimated soot loading.

10. A process according to claim 9, wherein the soot loading is estimated depending on a duration of the first period of time of step b).

11. A process according to claim 9, wherein the soot loading is estimated depending on a duration of the first period of time of step b) and depending on an estimated soot loading at step a).

12. A process according to claim 9, wherein the soot loading is estimated depending on a pressure difference through the particle filter.

13. A process according to claim 9, wherein the soot loading is estimated using an engine out soot emission model that estimates the soot emitted by engine as a function of engine operating parameters and using a soot regeneration model that estimates soot oxidation in the particle filter based on operating conditions at the particle filter.

14. A process according to claim 9, wherein the soot loading is estimated taking into account a rate and/or efficiency at which NO is converted into NO2 in a catalyst upstream of the particle filter.

15. A process according to claim 1, wherein the exhaust after treatment device further comprises a NOx reducing device, and wherein the process is further used to de-poison the NOx reducing device.

16. A process according to claim 15, wherein the step of detecting a regeneration trigger further comprises estimating that the NOx reducing device is poisoned.

17. A process according to claim 1, wherein the process comprises, prior to the step a), a step of detecting a regeneration trigger further comprises estimating that an accumulated engine operating parameter since a previous regeneration has exceeded a threshold.

18. A process according to claim 1, wherein the first temperature range is between 450 and 510 degrees Celsius.

19. A process according to claim 1, wherein the step of increasing the temperature at the particle filter to a second temperature range comprises increasing the temperature at the particulate filter up to over 600° C.

20. A process according to claim 1, wherein the temperature at the particle filter is maintained within the second temperature range during a second period of time.

21. An internal combustion engine arrangement, comprising:
   an internal combustion engine,
   an exhaust line for collecting the exhaust gas from the engine and conducting the exhaust gas towards the atmosphere;
   an exhaust after-treatment system in the exhaust line, the exhaust after-treatment system comprising at least a particle filter,
   heating means arranged to increase a temperature at the particle filter; and
   a controller for controlling the heating means
      wherein the controller is arranged to perform a process according to claim 1.

22. The internal combustion engine arrangement according to claim 21, comprising means for providing a triggering signal to the controller to begin raising the temperature at the particle filter to be within the first temperature range in response to a triggering event indicative of a need for regeneration of an exhaust gas after-treatment device in the exhaust after-treatment system.

23. The internal combustion engine arrangement according to claim 22, wherein the exhaust gas after-treatment device is at least one of a particle filter, a diesel oxidation catalyst, and a NOx reducing catalyst.

24. The internal combustion engine arrangement according to claim 21, wherein the controller is arranged to control the heating means to control a rate of increase of the temperature at the particle filter from the first temperature range to the second temperature range.

25. The internal combustion engine arrangement according to claim 21, comprising means for estimating soot loading of the particle filter.

26. The internal combustion engine according to claim 21, wherein the controller is arranged to control a heater so that soot on the particle filter is oxidized by passive NO2 regeneration until soot loading of the particle filter is at a second predetermined level and, after soot loading of the particle filter is at the second predetermined level, control the heater to raise the temperature at the particle filter to within the first temperature range and maintain the temperature at the particle filter within the first temperature range until a second determination is made that soot loading of the particle filter is below a predetermined level.

27. A vehicle comprising the internal combustion engine arrangement according to claim 21.

28. A vehicle comprising an internal combustion engine arrangement arranged for performing a process according to claim 1.

29. A process for regenerating an exhaust gas after-treatment device adapted to be fitted in an exhaust line of an internal combustion engine arrangement, the exhaust gas after-treatment device including a particle filter, comprising:
determining an initial soot loading in the particle filter,
performing a particle filter regeneration when the initial soot loading is above a predetermined level, wherein the particle filter regeneration comprises:
when the initial soot loading is above the predetermined level and further above
a safe high temperature regeneration level,
setting and maintaining temperature at the particle filter within a first temperature range during a first period of time until at least one of a predetermined period of time has lapsed, and
a determination has been made that soot loading of the particle filter is below the safe high temperature regeneration level, and
following the first period of time, increasing the temperature at the particle filter to be within a second temperature range above the first temperature range, and
when the initial soot loading is above the predetermined level but below the safe high temperature regeneration level,
increasing the temperature at the particle filter to be within the second temperature range above the first temperature range without first setting the temperature of exhaust gases within the first temperature range and without maintaining the temperature of the exhaust gases at the first temperature range for the first period of time.

30. The process according to claim 29, wherein the first temperature range is between 420 and 550° C.

31. The process according to claim 30, wherein the second temperature range is above 550° C.

32. The process according to claim 29, wherein the exhaust gas after-treatment device further includes at least one of a diesel oxidation catalyst, and a NOx reducing device.

33. The process according to claim 29, wherein the triggering event is a determination that soot loading of the particle filter is at a target maximum soot loading of the particle filter.

34. The process according to claim 29, wherein the exhaust gas after-treatment device further comprises a diesel oxidation catalyst or a NOx reducing catalyst, and the triggering event is a determination that the diesel oxidation catalyst or the NOx reducing catalyst is poisoned.

35. The process according to claim 29, wherein the triggering event is a determination that an accumulated engine operating parameter since a previous regeneration has exceeded a threshold.

36. The process according to claim 29, wherein determination of soot loading of the particle filter is made by modeling.

37. The process according to claim 29, wherein temperature at the particle filter is set and maintained within the first temperature range until the determination is made that soot loading of the particle filter is below the safe high temperature regeneration level, and wherein the determination that the soot loading of the particle filter is below the safe high temperature regeneration level is a function of a length of time that temperature at the particle filter has been maintained within the first temperature range.

38. The process according to claim 29, wherein the exhaust gas after-treatment device further comprises at least one of a diesel oxidation catalyst and at least a catalyzed portion of the particle filter.

39. The process according to claim 29, comprising, prior to maintaining temperature at the particle filter within the first temperature range, performing passive NO2 regeneration.

40. The process according to claim 29, comprising:
performing passive NO2 regeneration until soot loading of the particle filter is at a second predetermined level; and
after soot loading of the particle filter is at the second predetermined level, raising temperature at the particle filter to within the first temperature range, and maintaining temperature at the particle filter within the first temperature range until the determination is made that soot loading of the particle filter is below the safe high temperature regeneration level.

41. The process according to claim 40, wherein the second predetermined level is between 1.5 and 2 times the safe high temperature regeneration level.

42. The process according to claim 29, wherein the safe high temperature regeneration level is between 2-8 gC/l of the particle filter.

43. A process for regenerating an exhaust gas after-treatment device adapted to be fitted in an exhaust line of an internal combustion engine arrangement, the exhaust gas after-treatment device including a particle filter, comprising:
determining an initial soot loading in the particle filter,
performing a particle filter regeneration when the initial soot loading is above an initial predetermined level, wherein the particle filter regeneration comprises:
when the initial soot loading is above the initial predetermined level and further is above a first predetermined level
maintaining temperature of exhaust gases at the particle filter within a first temperature range during a first period of time that is at least one of a predetermined period of time and a time sufficient to reduce soot loading of the particle filter to below the first predetermined level and, after the first period of time, increasing the temperature of the exhaust gases at the particle filter to within a second temperature range above the first temperature range,
wherein, following the first period of time, increasing the temperature at the particle filter to be within a second temperature range above the first temperature range comprises controlling a rate of increase of the temperature of the exhaust gases at the particle filter from the first temperature range to the second temperature range, and
when the initial soot loading is above the initial predetermined level but below the first predetermined level, increasing the temperature at the particle filter to be within the second temperature range above the first temperature range without first maintaining the temperature of the exhaust gases at the particle filter within the first temperature range for the first period of time.

44. A process according to claim 43, wherein the step of increasing the temperature at the particle filter to be within the second temperature range above the first temperature range comprises increasing the temperature at the particle filter at a controlled rate of temperature increase over time, the controlled rate being controlled as a function of a soot loading determination of the particulate filter.

45. A process according to claim 43, wherein the temperature at the particle filter is increased at a rate of temperature increase over time which decreases over time.

46. A process according to claim 43, wherein the step of increasing the temperature at the particle filter to within the second temperature range above the first temperature range comprises increasing the temperature at the particle filter at a variable rate of temperature increase over time, a variation of which is controlled as a function of a soot loading determination of the particle filter at an end of the first period of time.

47. The process according to claim 43, comprising increasing the temperature of the exhaust gases at the particle filter by, first, increasing the temperature of the exhaust gases at the particle filter at a first rate of increase, and, subsequently, increasing the temperature of the exhaust gases at the particle filter at a second rate of increase that is different from the first rate of increase.

48. The process according to claim 47, wherein the second rate of increase is lower than the first rate of increase.

49. The process according to claim 48, wherein the second rate of increase is controlled as a function of soot loading of the particle filter after a predetermined period of time.

50. The process according to claim 49, wherein, when soot loading of the particle filter after the predetermined period of time is above a predetermined level, the second rate of increase is decreased relative to the second rate of increase when soot loading of the particle filter is below the predetermined level.

51. The process according to claim 47, wherein the first rate of increase is fixed.

52. A process for regenerating an exhaust gas aftertreatment device adapted to be fitted in an exhaust line of an internal combustion engine arrangement, wherein the exhaust gas after-treatment device comprises a particle filter, the process comprising:
determining an initial soot loading in the particle filter,
performing a particle filter regeneration when the initial soot loading is above an initial predetermined level, wherein the particle filter regeneration comprises:
when the initial soot loading is above the initial predetermined level and further above
a safe high temperature regeneration level, a) setting a temperature of exhaust gases at the particle filter within a first temperature range comprised between 420 and 550 degrees Celsius,
b) maintaining the temperature of exhaust gases at the particle filter at the first temperature range during a first period of time,
c) after the first period of time, further increasing the temperature at the particle filter to a second temperature range which is over 550 degrees Celsius,
wherein, during at least a sub-step of step c), the temperature at the particle filter is increased at a controlled rate of temperature increase over time which is controlled as a function of a soot loading determination of the particle filter, wherein the soot loading of the particle filter is an estimated soot loading, and wherein the soot loading is estimated using an engine out soot emission model that estimates the soot emitted by engine as a function of engine operating parameters and using a soot regeneration model that estimates soot oxidation in the particle filter based on operating conditions at the particle filter, and
when the initial soot loading is above the predetermined level but below the safe high temperature regeneration level,
increasing the temperature at the particle filter to the second temperature range without first setting the temperature of exhaust gases within the first temperature range and without maintaining the temperature of the exhaust gases at the first temperature range for the first period of time.

53. A process for regenerating an exhaust gas aftertreatment device adapted to be fitted in an exhaust line of an internal combustion engine arrangement, wherein the exhaust gas after-treatment device comprises a particle filter, the process comprising the steps of:
determining an initial soot loading in the particle filter,
performing a particle filter regeneration when the initial soot loading is above an initial predetermined level, wherein the particle filter regeneration comprises:
when the initial soot loading is above the initial predetermined level and further above a safe high temperature regeneration level,
after detecting the low temperature regeneration trigger
a) setting a temperature of exhaust gases at the particle filter within a first temperature range comprised between 420 and 550 degrees Celsius;
b) maintaining the temperature of the exhaust gases at the particle filter at the first temperature range during a first period of time,
c) after the first period of time, further increasing the temperature at the particle filter to a second temperature range which is over 550° degrees Celsius,
wherein, during step c), the temperature at the particle filter is increased in at least two sub-steps,
in a first sub-step c1) at a first rate of temperature increase over time,
a second sub-step c2) at a second rate of temperature increase over time,
where the second rate is lower than the first rate, and
when the initial soot loading is above the predetermined level but below the safe high temperature regeneration level,
increasing the temperature at the particle filter to the second temperature range without first setting the temperature of exhaust gases within the first temperature range and without maintaining the temperature of the exhaust gases at the first temperature range for the first period of time.

\* \* \* \* \*